(12) United States Patent
Wang et al.

(10) Patent No.: US 10,880,961 B1
(45) Date of Patent: Dec. 29, 2020

(54) LIGHT SOURCE DRIVING APPARATUS AND CURRENT ADJUSTING METHOD THEREOF

(71) Applicants: LITE-ON ELECTRONICS (GUANGZHOU) LIMITED, Guangzhou (CN); Lite-On Technology Corporation, Taipei (TW)

(72) Inventors: Yi-Yuan Wang, Taipei (TW); Feng-Hsu Lin, Taipei (TW)

(73) Assignees: LITE-ON ELECTRONICS (GUANGZHOU) LIMITED, Guangzhou (CN); Lite-On Technology Corporation, Taipei (TW)

(*) Notice: Subject to any disclaimer, the term of this patent is extended or adjusted under 35 U.S.C. 154(b) by 0 days.

(21) Appl. No.: 16/568,220

(22) Filed: Sep. 11, 2019

(30) Foreign Application Priority Data

Jul. 8, 2019 (CN) .......................... 2019 1 0610088

(51) Int. Cl.
| H05B 45/10 | (2020.01) |
| H05B 45/37 | (2020.01) |
| H05B 45/50 | (2020.01) |
| H05B 47/19 | (2020.01) |
| H05B 47/185 | (2020.01) |
| H05B 45/00 | (2020.01) |

(52) U.S. Cl.
CPC ............. *H05B 45/10* (2020.01); *H05B 45/37* (2020.01)

(58) Field of Classification Search
CPC ........ H05B 45/37; H05B 45/10; H05B 45/50; H05B 45/395; H05B 45/00
USPC .......................... 323/282, 280, 273, 271, 272
See application file for complete search history.

(56) References Cited

U.S. PATENT DOCUMENTS

| 2014/0091720 A1* | 4/2014 | Brinlee | H02M 1/4225 |
| | | | 315/186 |
| 2014/0167634 A1* | 6/2014 | Ivankovic | H05B 45/10 |
| | | | 315/210 |
| 2017/0353097 A1* | 12/2017 | Lai | H05B 45/382 |

FOREIGN PATENT DOCUMENTS

| CN | 103874287 | 6/2014 |
| TW | 201006081 | 2/2010 |
| WO | 2016107728 | 7/2016 |

OTHER PUBLICATIONS

"Office Action of Taiwan Counterpart Application", dated Feb. 6, 2020, p. 1-p. 6.
(Continued)

*Primary Examiner* — Wei (Victor) Y Chan
(74) *Attorney, Agent, or Firm* — JCIPRNET

(57) ABSTRACT

A light source driving apparatus including a primary side and a secondary side is provided. The light source driving apparatus includes an isolated current sensing circuit, a dimming circuit, an independent voltage source, and a feedback circuit. The isolated current sensing circuit is coupled to the secondary side, and samples an output current of the light source driving apparatus by electromagnetic coupling to generate a current sensing signal. The dimming circuit receives a dimming input signal, and provides a reference controlled-current signal according to the dimming input signal and based on an operating voltage. The independent voltage source is configured to generate the operating voltage. Based on the operating voltage, the feedback circuit provides a feedback signal according to the current sensing signal and the reference controlled-current signal for adjusting the output current of the light source driving apparatus.

13 Claims, 6 Drawing Sheets

(56) References Cited

OTHER PUBLICATIONS

"Office Action of Taiwan Counterpart Application", dated Jun. 4, 2020, p. 1-p. 8.

* cited by examiner

LIGHT SOURCE DRIVING APPARATUS AND CURRENT ADJUSTING METHOD THEREOF

CROSS-REFERENCE TO RELATED APPLICATION

This application claims the priority benefit of Chinese patent application serial no. 201910610088.1, filed on Jul. 8, 2019. The entirety of the above-mentioned patent application is hereby incorporated by reference herein and made a part of this specification.

BACKGROUND OF THE INVENTION

1. Field of the Invention

The present invention relates to light source driving apparatus, and more particularly to light source driving apparatus capable of adjusting an output current.

2. Description of Related Art

With the development of lighting technology, light emitting devices with dimming functions have been widely used in daily life to meet the lighting needs of different application scenarios. The light emitting device is typically configured with a drive circuit for dimming operation. For example, when a light emitting element of the light emitting device is a light emitting diode (LED), a LED drive circuit can be used to adjust a current output to the LED to control the brightness of the LED.

Conventional LED drive circuits usually use a secondary side resistor sampling current control method to adjust the brightness of the LED when performing the dimming operation. However, when a dimming signal is low, for example, the dimming ratio is 1%, current sampling through a secondary side resistor causes a sampling signal to be too low, thus making it impossible for the LED drive circuit to accurately control the output of a constant current.

In addition, based on specifications in the regulations (IEC 61347-1:2015, $3^{rd}$ edition), the dimming signal must be isolated from an output end of the LED drive circuit (i.e., isolated from a secondary side signal), so conventional LED drive circuits are usually required to be provided with two independent voltage sources, and a dimming output signal is supplied to a current feedback line side through an optical coupler, thereby achieving signal isolation and current feedback.

On the other hand, when the LED drive circuit is used for three-in-one dimming, the conventional three-in-one dimming method usually sets dimming frequency of a pulse width modulation (PWM) signal to a specific range. Therefore, the conventional LED drive circuit will be different in design of the frequency of the PWM signal, and sometimes the optical coupler with a high response speed is required to achieve a relatively complete dimming output signal, thereby achieving duty loss of the lower PWM signal.

SUMMARY OF THE INVENTION

The present invention provides light source driving apparatus and a current adjusting method thereof, which accurately control the output of a constant current under a low dimming current.

An embodiment of the present invention provides light source driving apparatus comprising a primary side and a secondary side. The light source driving apparatus comprises an isolated current sensing circuit, a dimming circuit, an independent voltage source, and a feedback circuit. The isolated current sensing circuit is coupled to the secondary side, and samples an output current of the light source driving apparatus by electromagnetic coupling to generate a current sensing signal. The dimming circuit receives a dimming input signal, and provides a reference controlled-current signal according to the dimming input signal and based on an operating voltage. The independent voltage source generates the operating voltage. The feedback circuit is coupled between the isolated current sensing circuit and the primary side of the light source driving apparatus, and the feedback circuit is coupled to the independent voltage source and the dimming circuit. The feedback circuit performs a feedback operation based on the operating voltage, and provides a feedback signal according to the current sensing signal and the reference controlled-current signal. The light source driving apparatus adjusts the output current of the light source driving apparatus according to the feedback signal.

Another embodiment of the present invention provides a current adjusting method of light source driving apparatus. The current adjusting method comprises: sampling an output current of the light source driving apparatus by electromagnetic coupling to generate a current sensing signal; receiving a dimming input signal, and providing a reference controlled-current signal according to the dimming input signal and based on an operating voltage; generating the operating voltage by an independent voltage source; and performing a feedback operation based on the operating voltage, and providing a feedback signal according to the current sensing signal and the reference controlled-current signal to adjust the output current of the light source driving apparatus.

Based on the above, in the embodiments of the present invention, the light source driving apparatus achieves a signal isolation effect required by the regulations by providing an isolated current sensing circuit and the single independent voltage source. In addition, the output current of the light source driving apparatus is sampled through the isolated current sensing circuit, and the output of a constant current is accurately controlled at a low dimming current. Furthermore, since the feedback circuit and the dimming circuit in the light source driving apparatus operate only through the single independent voltage source, the light source driving apparatus of the present invention does not need to be provided with two independent voltage sources.

In order to make the aforementioned and other objectives and advantages of the present invention comprehensible, embodiments accompanied with figures are described in detail below.

DESCRIPTION OF THE EMBODIMENTS

Figure 1:
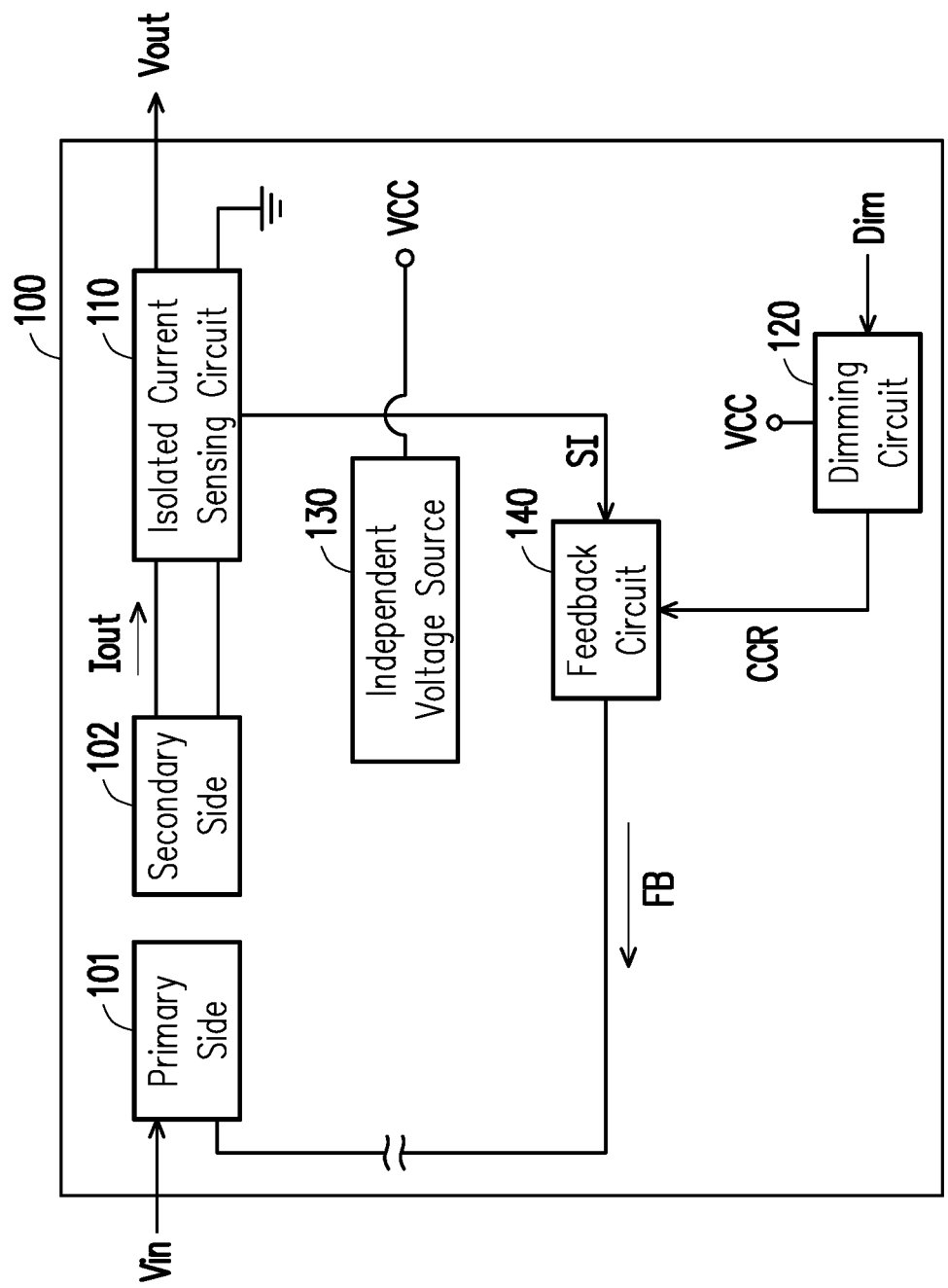
FIG. 1 is a circuit block diagram of light source driving apparatus according to an embodiment of the present invention.

FIG. 1 is a circuit block diagram of light source driving apparatus 100 according to an embodiment of the present invention. As shown in FIG. 1, the light source driving apparatus 100 includes a primary side 101 and a secondary side 102. The light source driving apparatus 100 receives an input voltage Vin and converts the input voltage Vin into an output current Iout and an output voltage Vout to serve as a driving power source of a rear end light emitting device (not shown). In order to achieve the purpose of dimming control, the light source driving apparatus 100 of FIG. 1 includes an isolated current sensing circuit 110, a dimming circuit 120, an independent voltage source 130, and a feedback circuit 140.

As shown in FIG. 1, the isolated current sensing circuit 110 is coupled to the secondary side 102 of the light source driving apparatus 100. The isolated current sensing circuit 110 samples the output current Iout of the light source driving apparatus 100 by electromagnetic coupling to generate a current sensing signal SI. For example, the isolated current sensing circuit 110 is a current transformer, and the current transformer senses the output current Iout of the light source driving apparatus 100 by electromagnetic coupling to generate the current sensing signal SI.

Referring to FIG. 1 again, the dimming circuit 120 receives a dimming input signal Dim and provides a reference controlled-current signal CCR according to the dimming input signal Dim and based on an operating voltage VCC. In other words, the dimming circuit 120 only needs to use a single power source (operating voltage VCC) to provide the reference controlled-current signal CCR according to the dimming input signal Dim. In some embodiments, the dimming input signal Dim is a DC voltage signal or a pulse width modulation signal, and the dimming circuit 120 generates the reference controlled-current signal CCR by changing the magnitude of the DC voltage or the operating cycle of a pulse wave.

The independent voltage source 130 is configured to generate the operating voltage VCC. The feedback circuit 140 is coupled between the isolated current sensing circuit 110 and the primary side 101 of the light source driving apparatus 100, and the feedback circuit 140 is coupled to the independent voltage source 130 and the dimming circuit 120.

For example, the feedback circuit 140 uses the operating voltage VCC as a power supply source, and receives the current sensing signal SI provided by the isolated current sensing circuit 110 and the reference controlled-current signal CCR provided by the dimming circuit 120. The feedback circuit 140 provides a feedback signal FB according to the current sensing signal SI and the reference controlled-current signal CCR. The light source driving apparatus 100 adjusts the output current Iout of the light source driving apparatus 100 according to the feedback signal FB.

In the embodiment of FIG. 1, the current sensing signal SI is sampled by the isolated mode of the isolated current sensing circuit 110, and the dimming circuit 120 operates according to the operating voltage VCC generated by the independent voltage source 130. Therefore, the present invention does not need to be provided with another isolated voltage source to achieve the function of mutual separation of the dimming circuit 120 and the secondary side 102 of the light source driving apparatus 100, which meets the requirements of the regulations. In addition, through the design of FIG. 1, the dimming circuit 120 does not need to be provided with an additional isolation element (such as an optical coupler) to provide the reference controlled-current signal CCR for the feedback circuit 140, thereby achieving cost reduction. Furthermore, since the feedback circuit 140 and the dimming circuit 120 in the light source driving apparatus 100 operate only through a single independent voltage source 130, the light source driving apparatus 100 of the present invention does not need to be provided with two isolated voltage sources.

By the way, the current sensing signal SI obtained by the isolated current sensing circuit 110 maintains a high resolution under the lower dimming signal for feedback control. For example, it is assumed that the output current Tout of the light source driving apparatus 100 is 2.8 A, and that the control voltage that is generated by the conversion of the current transformer and a sampling resistor is 2.8 V. Therefore, when the dimming signal is low, for example, the dimming ratio is 1%, the current transformer still provides a sampling signal of 28 mV (much larger than a compensated offset voltage specification of a general operational amplifier), so the current sampling conducted by using the isolated current sensing circuit 110 achieves low dimming accuracy.

Figure 2A:
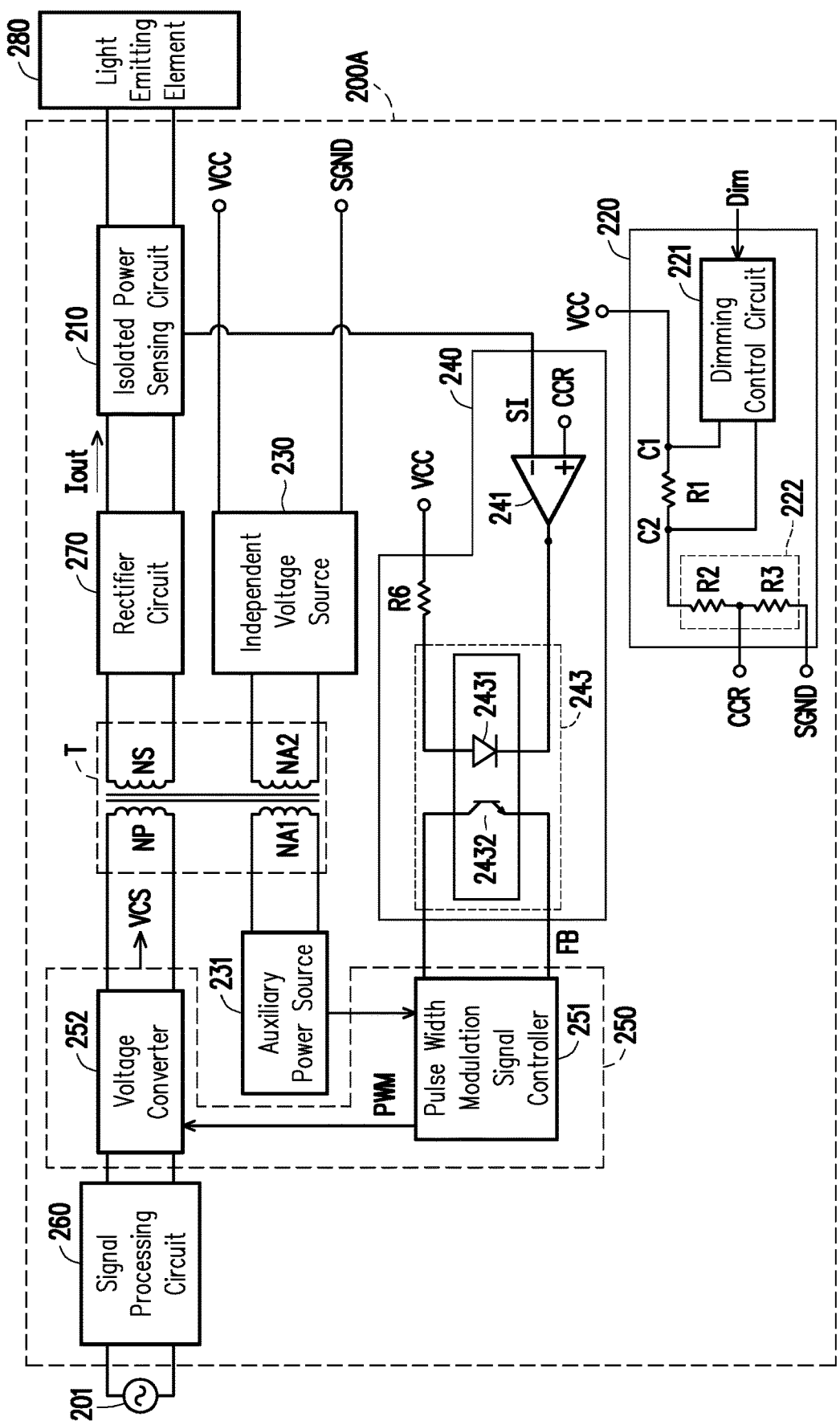
FIG. 2A to FIG. 2D are circuit block diagrams respectively showing light source driving apparatus according to different embodiments of the present invention.

FIG. 2A to FIG. 2D are circuit block diagrams respectively showing light source driving apparatus 200A-200D according to different embodiments of the present invention. As shown in FIG. 2A, the light source driving apparatus 200A receives the power supplied from an AC power source 201 and converts the power into the output current Tout to drive a light emitting element 280. The light source driving apparatus 200A includes a transformer T, an isolated current sensing circuit 210, a dimming circuit 220, an independent voltage source 230, a feedback circuit 240, a voltage conversion circuit 250, a signal processing circuit 260, and a rectifier circuit 270.

The signal processing circuit 260 is coupled between the AC power source 201 and the voltage conversion circuit 250. The signal processing circuit 260 performs rectification filtering or power factor correction on an AC signal provided by the AC power source 201 to generate a DC signal. The voltage conversion circuit 250 converts the DC signal provided by the signal processing circuit 260 into a voltage adjustment signal VCS according to the received feedback signal FB. The voltage adjustment signal VCS is a voltage signal adjusted from a pulse width modulation signal PWM.

For example, the voltage conversion circuit 250 of FIG. 2A includes a pulse width modulation signal controller 251 and a voltage converter 252. The pulse width modulation signal controller 251 is coupled to the feedback circuit 240. The pulse width modulation signal controller 251 generates the pulse width modulation signal PWM according to the feedback signal FB. The voltage converter 252 is coupled to the pulse width modulation signal controller 251 to receive the pulse width modulation signal PWM. The voltage converter 252 provides the voltage adjustment signal VCS according to the pulse width modulation signal PWM and transmits the voltage adjustment signal VCS to the transformer T. In this way, the transformer T adjusts the output current Tout of the light source driving apparatus 200A according to the voltage adjustment signal VCS.

The transformer T includes a primary side coil NP and a secondary side coil NS. The primary side coil NP is coupled to the voltage conversion circuit 250, and the secondary side coil NS is coupled to the isolated current sensing circuit 210 via the rectifier circuit 270. The secondary side coil NS of the transformer T generates an induced current corresponding to the voltage adjustment signal VCS on the primary side coil NP, and the induced current is subjected to rectification filtering by the rectifier circuit 270 to generate the output current Tout. Further, the voltage adjustment signal VCS is a voltage across the primary side coil NP of the transformer T, that is, a potential difference across two ends of the primary side coil NP of the transformer T.

In the embodiment of FIG. 2A, the transformer T further includes a primary side auxiliary coil NA1 and a secondary side auxiliary coil NA2. The primary side auxiliary coil NA1 is coupled to the auxiliary power source 231, and the secondary side auxiliary coil NA2 is coupled to the independent voltage source 230. The auxiliary power source 231 supplies power to the pulse width modulation signal controller 251, and the independent voltage source 230 supplies the operating voltage VCC for the dimming circuit 220 and the feedback circuit 240.

The isolated current sensing circuit 210 samples the output current Iout of the light source driving apparatus 200A by electromagnetic coupling to generate a current sensing signal SI. For example, the isolated current sensing circuit 210 is a current transformer, and the current transformer senses the output current at the output end of the rectifier circuit 270 by electromagnetic coupling to generate the current sensing signal SI.

The dimming circuit 220 receives the dimming input signal Dim and provides the reference controlled-current signal CCR according to the dimming input signal Dim. In the present embodiment, the dimming circuit 220 includes a dimming control circuit 221 and a voltage dividing circuit 222. The dimming control circuit 221 in the dimming circuit 220 is a three-in-one dimming circuit (that is, 0-10 V DC dimming/PWM dimming/variable resistance dimming), a digital addressable lighting interface (DALI) circuit or an Internet of Things (IoT) dimming circuit.

The dimming control circuit 221 converts the dimming input signal Dim into the reference controlled-current signal CCR according to different types of dimming control interfaces. An input end of the dimming control circuit 221 receives the dimming input signal Dim. In some embodiments, the dimming input signal Dim is a DC voltage signal or a pulse width modulation signal.

An input end C1 and an output end C2 of the dimming control circuit 221 are respectively coupled to the operating voltage VCC and the voltage dividing circuit 222. A resistor R1 is connected between the input end C1 and the output end C2 of the dimming control circuit 221. The voltage dividing circuit 222 includes a resistor R2 and a resistor R3. A first end of the resistor R2 is coupled to the output end C2. A first end of the resistor R3 is coupled to a second end of the resistor R2, and a second end of the resistor R3 is coupled to a ground voltage level SGND. The dimming circuit 220 provides the reference controlled-current signal CCR through the voltage division of the operating voltage VCC on the resistor R3. In addition, the resistance values of the resistor R2 and the resistor R3 are determined according to design requirements. The resistor R2 and the resistor R3 have the same resistance value or different resistance values, which is not limited by the present invention.

Referring again to FIG. 2A, the feedback circuit 240 includes a first comparator 241 and an optical coupling element 243. The first comparator 241 is coupled to the isolated current sensing circuit 210 and the dimming circuit 220 to receive the current sensing signal SI and the reference controlled-current signal CCR. The first comparator 241 compares the current sensing signal SI with the reference controlled-current signal CCR to generate a first comparison signal.

In FIG. 2A, the optical coupling element 243 includes a light emitting diode 2431 and an optical coupling transistor 2432. A first end of the light emitting diode 2431 is coupled to the operating voltage VCC via a resistor R6, and a second end of the light emitting diode 2431 is coupled to an output end of the first comparator 241. A first end and a second end of the optical coupling transistor 2432 are coupled to the voltage conversion circuit 250. The optical coupling element 243 provides the feedback signal FB for the voltage conversion circuit 250 according to the first comparison signal generated by the first comparator 241. For example, the light emitting diode 2431 in the optical coupling element 243 generates a corresponding optical signal based on the first comparison signal. The optical coupling transistor 2432 receives the optical signal of the light emitting diode 2431 to generate the feedback signal FB.

The voltage conversion circuit 250 provides the voltage adjustment signal VCS according to the feedback signal FB, so that the transformer T transmits the voltage adjustment signal VCS to adjust the output current Tout of the light source driving apparatus 200A. For example, when the current sensing signal SI is smaller than the reference controlled-current signal CCR, the first comparator 241 notifies the optical coupling element 243 to generate the feedback signal FB that increases the output current Tout. When the current sensing signal SI is larger than the reference controlled-current signal CCR, the first comparator 241 notifies the optical coupling element 243 to generate the feedback signal FB that reduces the output current Tout.

Figure 2B:
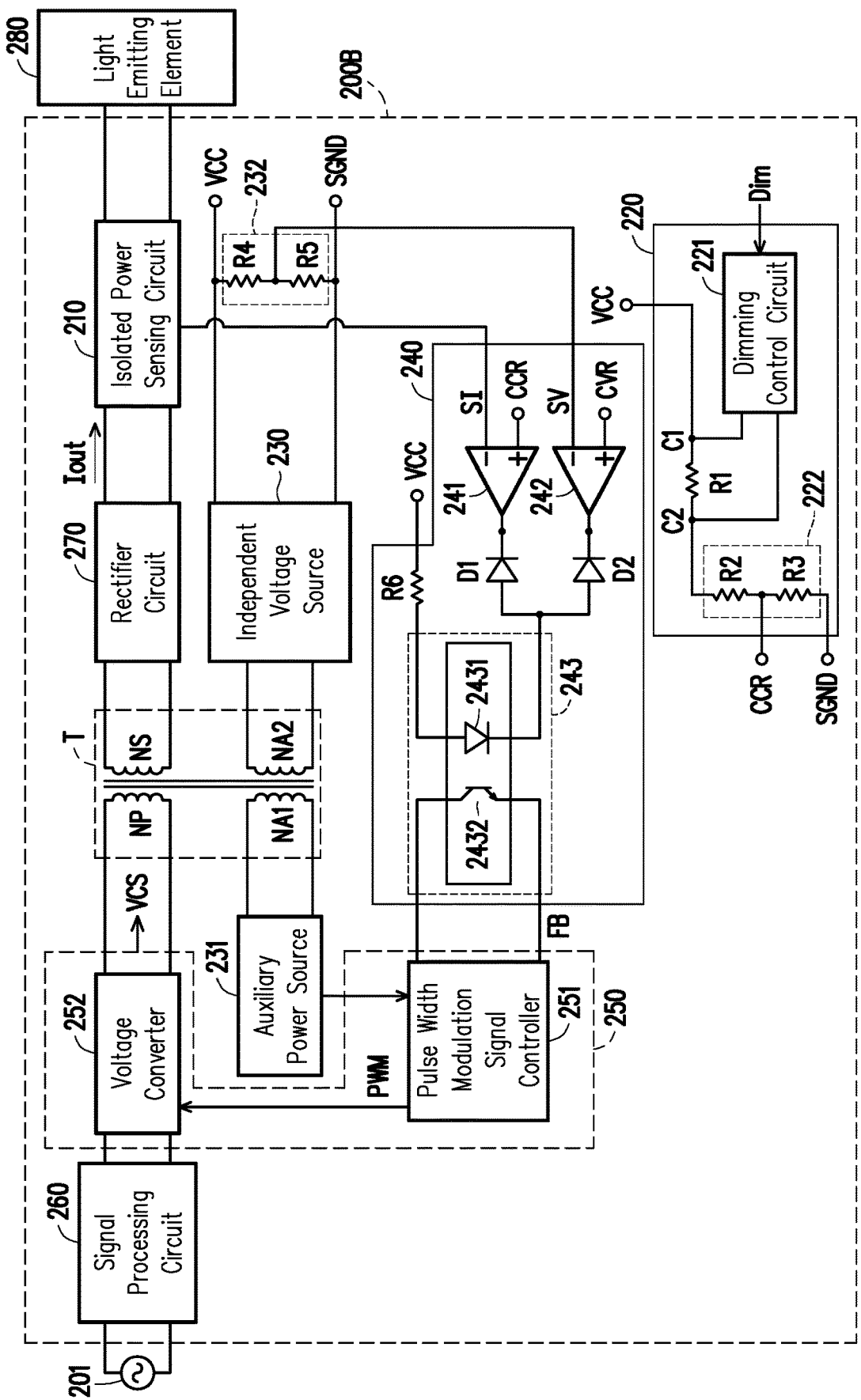
Figure 2C:
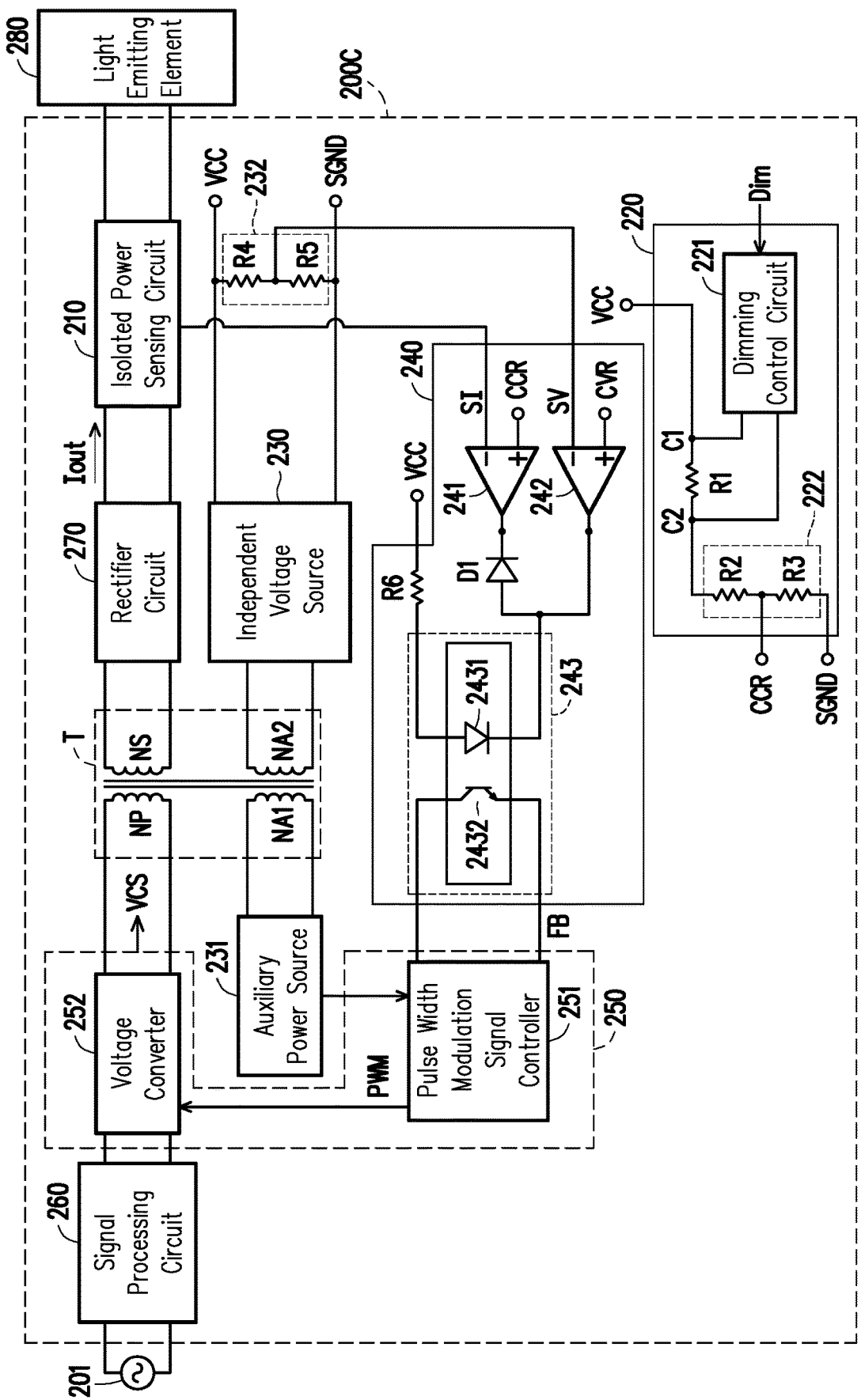
Figure 2D:
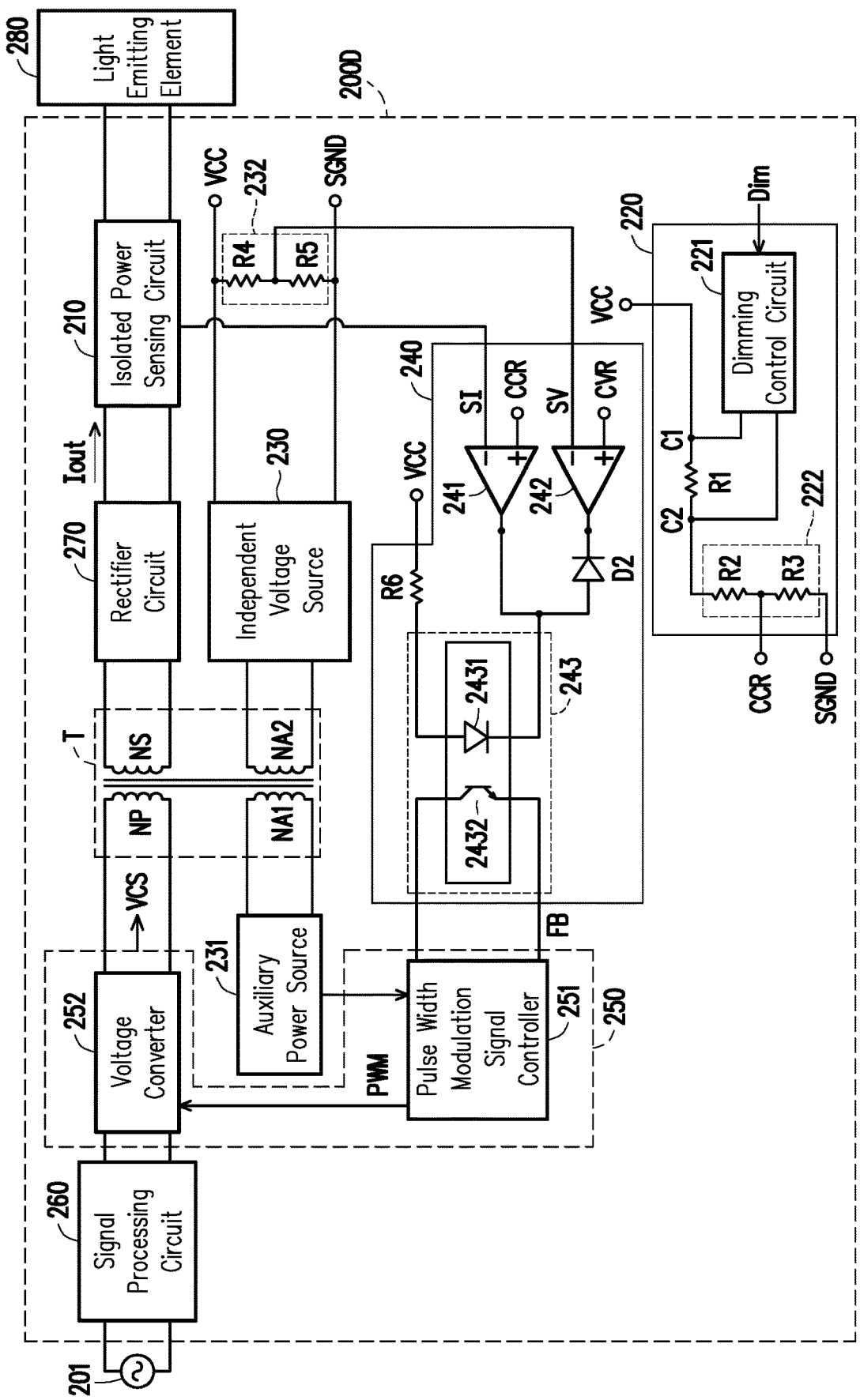

On the other hand, in the embodiments of FIG. 2B to FIG. 2D, the feedback circuit 240 is also configured to indirectly determine the output voltage level of the light emitting element 280. Referring to FIG. 2B, in the light source driving apparatus 200B of FIG. 2B, the independent voltage source 230 is further coupled to the voltage dividing circuit 232, and the feedback circuit 240 further includes a second comparator 242, a first diode D1 and a second diode D2. The independent voltage source 230 of FIG. 2B provides a voltage sensing signal SV via the voltage dividing circuit 232. The second comparator 242 of FIG. 2B is coupled to the voltage dividing circuit 232 to receive the voltage sensing signal SV.

For example, the independent voltage source 230 of FIG. 2B is coupled to the voltage dividing circuit 232 composed of resistors R4 and R5, and provides the voltage sensing signal SV through the voltage division of the operating voltage VCC on the resistor R5. In the voltage dividing circuit 232, a first end of the resistor R4 is coupled to the operating voltage VCC, a second end of the resistor R4 is coupled to a first end of the resistor R5, and a second end of the resistor R5 is coupled to the ground voltage level SGND. In addition, the resistance values of the resistor R4 and the resistor R5 are determined according to design requirements. The resistor R4 and the resistor R5 have the same resistance value or different resistance values, which is not limited by the present invention.

The second comparator 242 of FIG. 2B compares the voltage sensing signal SV with a reference controlled-voltage signal CVR to generate a second comparison signal. In FIG. 2B, the second comparison signal generated by the second comparator 242 is used to sense the voltage of the light emitting element 280 and achieve a feedback control operation for the voltage of the light emitting element 280 according to design requirements. For example, when the voltage sensing signal SV is smaller than the reference controlled-voltage signal CVR, the second comparator 242 notifies the optical coupling element 243 to adjust the feedback signal FB to increase the output voltage. When the voltage sensing signal SV is larger than the reference controlled-voltage signal CVR, the second comparator 242 notifies the optical coupling element 243 to adjust the feedback signal FB to reduce the output voltage.

It should be noted that in the embodiment of FIG. 2B, the first comparator 241 and the second comparator 242 are coupled to the optical coupling element 243 via the first diode D1 and the second diode D2 respectively. In other embodiments, the first comparator 241 or the second comparator 242 are also directly coupled to the optical coupling element 243. For example, as shown in FIG. 2C, the first comparator 241 is coupled to the optical coupling element 243 via the first diode D1, and the second comparator 242 is directly coupled to the optical coupling element 243. In the embodiment of FIG. 2D, the first comparator 241 is directly coupled to the optical coupling element 243, and the second comparator 242 is coupled to the optical coupling element 243 via the second diode D2.

By the way, in the embodiments of FIG. 2A to FIG. 2D, the independent voltage source 230, the feedback circuit 240 and the dimming circuit 220 in the light source driving apparatus 200A-200D are disposed on the same circuit board, and the dimming control circuit 221 in the dimming circuit 220 is designed as a different type of interface card. Therefore, the function of quickly switching between different dimming control interfaces is achieved by simply swapping the interface card of the dimming circuit 220.

Figure 3:
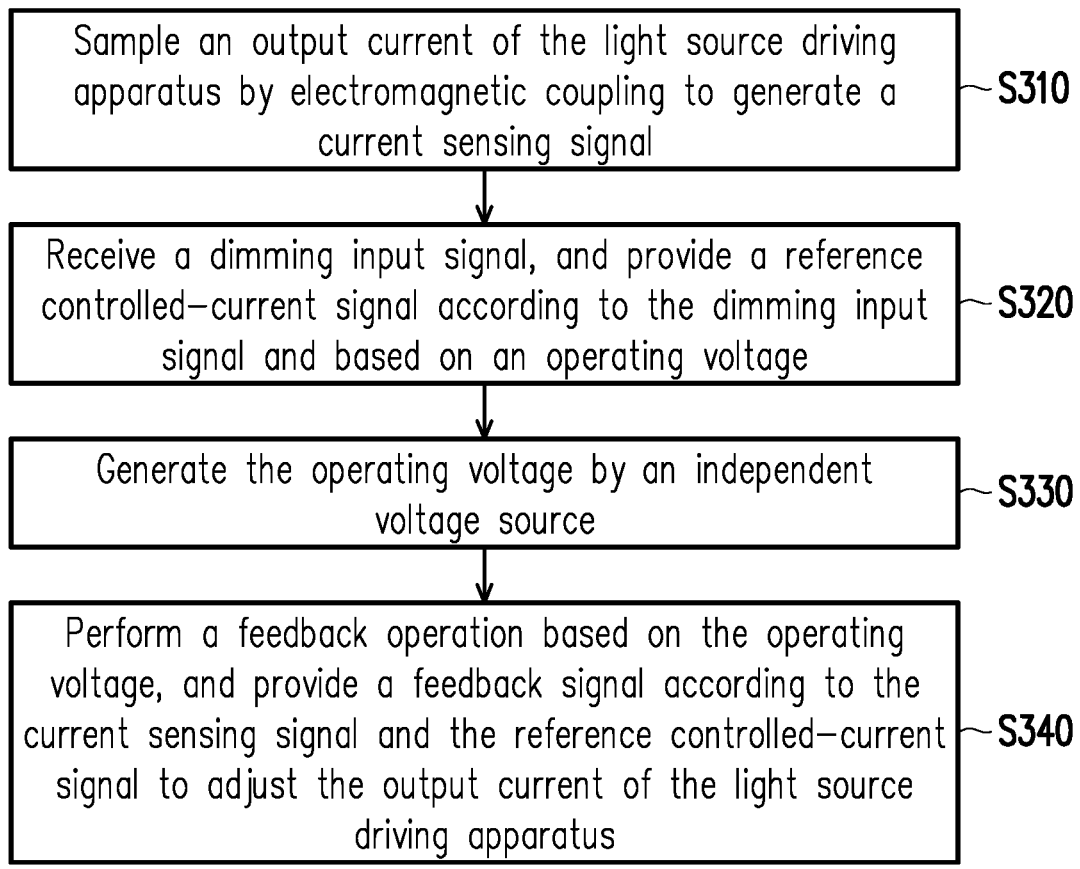
FIG. 3 is a flow chart showing a current adjusting method of light source driving apparatus according to an embodiment of the present invention.

FIG. 3 is a flow chart showing a current adjusting method of light source driving apparatus according to an embodiment of the present invention. Referring to FIG. 1 and FIG. 3, in step S310, the isolated current sensing circuit 110 samples the output current Tout of the light source driving apparatus 100 by electromagnetic coupling, thereby generating the current sensing signal SI. In step S320, the dimming circuit 120 receives the dimming input signal Dim and provides the reference controlled-current signal CCR according to the dimming input signal Dim and based on an operating voltage VCC. In other words, the dimming circuit 120 only needs to use a single power source (operating voltage VCC) to provide the reference controlled-current signal CCR according to the dimming input signal Dim.

In step S330, the light source driving apparatus 100 generates the operating voltage VCC by the single independent voltage source 130. In step S340, the feedback circuit 140 performs a feedback operation based on the operating voltage VCC. That is, in step S340, the feedback circuit 140 uses the operating voltage VCC as a power supply source, and provides the feedback signal FB according to the current sensing signal SI and the reference controlled-current signal CCR.

In this way, the light source driving apparatus 100 adjusts the output current Tout of the light source driving apparatus 100 according to the feedback signal FB. The implementation details of steps S310-S340 are analogized with reference to the related description of the embodiment shown in FIG. 1, and therefore will not be described again.

Based on the above, in the embodiments of the present invention, the light source driving apparatus achieves the signal isolation effect required by the regulations by providing the isolated current sensing circuit and the single independent voltage source. In addition, the output current of the light source driving apparatus is sampled through the isolated current sensing circuit, and the output of a constant current is accurately controlled at a low dimming current. Furthermore, since the independent voltage source, the feedback circuit and the dimming circuit in the light source driving apparatus are disposed on the same circuit board, the function of quickly switching between different dimming control interfaces is achieved by simply swapping the interface card of the dimming circuit.

Although the present invention has been disclosed with the above embodiments, it is not intended to limit the present invention. Any person having ordinary skill in the art can make some changes and modifications without departing from the spirit and scope of the present invention. Therefore, the protection scope of the present invention shall be defined by the appended claims.

What is claimed is:

1. Light source driving apparatus having a primary side and a secondary side, comprising:
   an isolated current sensing circuit, coupled to the secondary side, wherein the isolated current sensing circuit samples an output current of the light source driving apparatus by electromagnetic coupling to generate a current sensing signal;
   a dimming circuit, receiving a dimming input signal, and providing a reference controlled-current signal according to the dimming input signal and based on an operating voltage;
   an independent voltage source, generating the operating voltage;
   a feedback circuit, coupled between the isolated current sensing circuit and the primary side of the light source driving apparatus, the feedback circuit being coupled to the independent voltage source and the dimming circuit, wherein the feedback circuit performs a feedback operation based on the operating voltage, and provides a feedback signal according to the current sensing signal and the reference controlled-current signal,
   wherein the light source driving apparatus adjusts the output current of the light source driving apparatus according to the feedback signal;
   a transformer, comprising a primary side coil and a secondary side coil, wherein the primary side coil is coupled to the primary side of the light source driving apparatus, and the secondary side coil is coupled to the isolated current sensing circuit; and
   a voltage conversion circuit, coupled to the feedback circuit and the primary side coil of the transformer, wherein the voltage conversion circuit provides a voltage adjustment signal according to the feedback signal, and the transformer adjusts the output current of the light source driving apparatus according to the voltage adjustment signal,
   wherein the voltage conversion circuit comprises:
   a pulse width modulation signal controller, coupled to the feedback circuit, and generating a pulse width modulation signal according to the feedback signal; and a voltage converter, coupled to the pulse width modulation signal controller and the primary side coil of the transformer, and providing the voltage adjustment signal according to the pulse width modulation signal.

2. The light source driving apparatus according to claim 1, wherein the transformer further comprises a primary side auxiliary coil and a secondary side auxiliary coil, wherein an auxiliary power source is coupled to the primary side auxiliary coil to supply power to the pulse width modulation signal controller, and the secondary side auxiliary coil is coupled to the independent voltage source.

3. The light source driving apparatus according to claim 1, wherein the independent voltage source provides a voltage sensing signal via a first voltage dividing circuit, and the feedback circuit provides the feedback signal according to the current sensing signal, the reference controlled-current signal and the voltage sensing signal.

4. The light source driving apparatus according to claim 1, wherein the dimming circuit provides the reference controlled-current signal for the feedback circuit.

5. The light source driving apparatus according to claim 1, wherein the dimming circuit comprises an input end and an output end, the input end being coupled to the operating voltage, and the output end being coupled to a second voltage dividing circuit.

6. The light source driving apparatus according to claim 5, wherein a first resistor is connected between the input end and the output end of the dimming circuit.

7. The light source driving apparatus according to claim 6, wherein the second voltage dividing circuit comprises:
 a second resistor, wherein a first end of the second resistor is coupled to the output end; and
 a third resistor, wherein a first end of the third resistor is coupled to a second end of the second resistor, and a second end of the third resistor is coupled to a ground voltage level.

8. The light source driving apparatus according to claim 1, wherein the isolated current sensing circuit is a current transformer.

9. The light source driving apparatus according to claim 1, wherein the feedback circuit comprises:
 a first comparator, coupled to the isolated current sensing circuit and the dimming circuit to receive the current sensing signal and the reference controlled-current signal, wherein the first comparator compares the current sensing signal with the reference controlled-current signal to generate a first comparison signal; and
 an optical coupling element, coupled to the first comparator, wherein the optical coupling element provides the feedback signal according to the first comparison signal.

10. The light source driving apparatus according to claim 3, wherein the feedback circuit comprises:
 a first comparator, coupled to the isolated current sensing circuit and the dimming circuit to receive the current sensing signal and the reference controlled-current signal, wherein the first comparator compares the current sensing signal with the reference controlled-current signal to generate a first comparison signal;
 a second comparator, coupled to the first voltage dividing circuit to receive the voltage sensing signal, wherein the second comparator compares the voltage sensing signal with a reference controlled-voltage signal to generate a second comparison signal; and
 an optical coupling element, coupled to the first comparator and the second comparator, wherein the optical coupling element provides the feedback signal according to the first comparison signal and the second comparison signal.

11. The light source driving apparatus according to claim 10, wherein the first comparator or the second comparator is directly coupled to the optical coupling element.

12. The light source driving apparatus according to claim 10, wherein the first comparator and the second comparator are respectively coupled to the optical coupling element via a first diode and a second diode.

13. The light source driving apparatus according to claim 12, wherein the optical coupling element comprises:
 a light emitting diode, wherein a first end of the light emitting diode is coupled to the operating voltage, and a second end of the light emitting diode is coupled to an anode of the first diode and an anode of the second diode; and
 an optical coupling transistor, wherein a first end and a second end of the optical coupling transistor are coupled to the voltage conversion circuit.

* * * * *